United States Patent [19]

Uebelstadt et al.

[11] Patent Number: 4,781,398
[45] Date of Patent: Nov. 1, 1988

[54] FRAME UNIT FOR VEHICLES

[75] Inventors: Manfred Uebelstadt; Peter Watzold, both of Wettstetten; Roland Heidl, Lenting, all of Fed. Rep. of Germany

[73] Assignee: Audi AG, Ingolstadt, Fed. Rep. of Germany

[21] Appl. No.: 11,632

[22] Filed: Feb. 6, 1987

[30] Foreign Application Priority Data

Feb. 6, 1986 [DE] Fed. Rep. of Germany ....... 3603706

[51] Int. Cl.[4] .............................................. B60R 21/00
[52] U.S. Cl. ..................................... 280/784; 280/785
[58] Field of Search ....................... 280/781, 784, 785; 180/311

[56] References Cited

U.S. PATENT DOCUMENTS

| 2,074,158 | 3/1937 | Avery | 280/785 |
| 3,409,098 | 11/1968 | Brueder | 280/781 |
| 3,940,176 | 2/1976 | Ito et al. | 280/784 |
| 4,046,415 | 9/1977 | Klees et al. | 280/781 |
| 4,440,435 | 4/1984 | Norlin | 280/784 |
| 4,613,184 | 9/1986 | Rispeter et al. | 280/781 |

FOREIGN PATENT DOCUMENTS

| 1004496 | 3/1957 | Fed. Rep. of Germany . |
| 2845548 | 4/1980 | Fed. Rep. of Germany . |
| 2408548 | 5/1982 | Fed. Rep. of Germany . |
| 3434452 | 3/1986 | Fed. Rep. of Germany . |

Primary Examiner—Ross Weaver
Attorney, Agent, or Firm—Lalos & Keegan

[57] ABSTRACT

A frame unit for a vehicle having a main frame unit adapted to support the main body of the vehicle comprising a pair of structural side members and a structural cross-piece member defining an integral extension unit having an H-shaped configuration, such extension unit including means disposed at the intersections of the side members and the cross-piece member and on rearwardly disposed sections of the side members for securing the extension unit to the main frame unit of the vehicle whereby sections of the side members extend forwardly to the main frame unit and are disposed in a crumple zone of the vehicle.

15 Claims, 3 Drawing Sheets

FRAME UNIT FOR VEHICLES

This invention relates to a frame unit for a vehicle and more particularly to a frame unit detachably mountable on the front end of a main frame unit of a vehicle for absorbing frontal and lateral impact loads applied to the vehicle.

A frame arrangement of the type provided in the present invention is disclosed in DE-AS No. 10 04 496. In accordance with such disclosure, there is provided a front frame which is separate from a main body supporting frame of the vehicle, on which the drive unit consisting of an engine and transmission may be located together with the front wheel suspension. This front frame, provided with the drive unit and other assemblies may then be attached to the main body supporting frame of the vehicle in a very simple manner during production on the main passenger car assembly line.

The structural design shown in DE-AS No. 10 04 496 provides the advantage that the production of automobiles is made possible on a relatively short main assembly line. However, it must be considered a shortcoming of this design that the automobiles thus produced are not in optimum compliance with established safety requirements. For instance, in head-on collisions, the connecting bolts joining the front frame and the main body supporting frame could possibly be sheared off by substantial transverse forces acting on them. Thus, the crumple zone, which is of very unfavorable design in the first place, would not be entirely effective. Based on the rigid connection of the two longitudinally disposed structural members with the structural cross-piece member, an integral rigid system is provided precisely in the area where flexibility and deformability are critical. This automatically always affects both the longitudinally disposed structural members and, since each of such members simultaneously functions to support the wheel suspension, there are lasting effects on the axle geometry. Another disadvantage of the prior art arrangement is the selected location of the respective wheel suspension. If transverse forces are applied to the vehicle, such forces are applied to the longitudinally disposed structural members in an extremely unfavorable manner, namely axially, so that such members, functioning as bending members, must absorb the total impact load. Among other things, this may have a negative effect on the manner in which the vehicle performs.

The aforementioned disadvantages also are applicable to the frame arrangement disclosed in DE-PS No. 24 08 548. Moreover, the device disclosed therein does not provide any substantial benefits with respect to the manufacture of the vehicle. In this regard, the problem members are the two bridges with their connecting cross-piece member.

DE-OS No. 28 45 548 discloses a one-piece support structure of a very costly design, extending between the bumper and the passenger compartment. This support structure crumples as a unit, as shown particularly in FIG. 3 thereof. This means that any repairs that might still be possible after a head-on collision would be extremely expensive. Moreover, the distribution of the forces occurring during a crash does not appear to be resolved in an optimum manner.

In DE-OS No. 18 16 428 and DE-PS No. 26 20 927, front frame arrangements are disclosed which provide longitudinally disposed structural side members rigidly connected to the remaining frame members of the vehicle body, as well as center and front cross-piece members connecting the two side members, however, without providing the production-related advantages presently available in vehicle production.

Aside from the fact that the previously mentioned transverse forces (for instance in cornering) can be more favorably distributed between both longitudinally disposed structural side members, the arrangements disclosed in such two references, essentially provide the same disadvantages as already mentioned in connection with, for instance, the arrangement disclosed in DE-AS No. 10 04 496.

Accordingly, it is the principal object of the present invention to provide a frame arrangement which facilitates production, while providing an arrangement having an optimum and precisely defined separation between a crumple zone and a safety zone protecting the occupant of the vehicle.

This object is achieved by a frame arrangement of the present invention. The invention also makes it possible, in an especially advantageous manner, to achieve a defined distribution of the forces occurring during a crash and, based on this, to design, i.e., dimension these elements reliably. Thus, each longitudinally disposed structural side member in the area of the axle suspension, provides a nodal point which unites three load-bearing members—namely, the rear area of each side member, a cross-piece member providing a unit having an H-shaped configuration, and the connecting point of the main support frame of the vehicle—thereby creating an extremely stable "tripod". Finally, the crumple zone is defined by the forwardly disposed section of the side members, extending from the respective nodal point forwardly (in the direction of travel). The increased rigidity of the frame in the area of each wheel suspension affords an optimum absorption of transverse forces. Among other things, this also contributes to more precise wheel guidance and results in improved steerability. Since, moreover, the deformation of one side member of the unit in the area of the crumple zone does not necessarily result in damage to the other side member of the unit, thus affecting the axial geometry of the wheel suspension, this may have a favorable effect on repair costs. Finally, due to the torsion-resistant joint, which consequently tends to vibrate very little, the acoustical characteristics are positively influenced as well.

Other objects and advantages of the present invention will become more apparent to those persons having ordinary skill in the art to which the present invention pertains from the following description taken in conjunction with the accompanying drawings in which.

Figure 1:
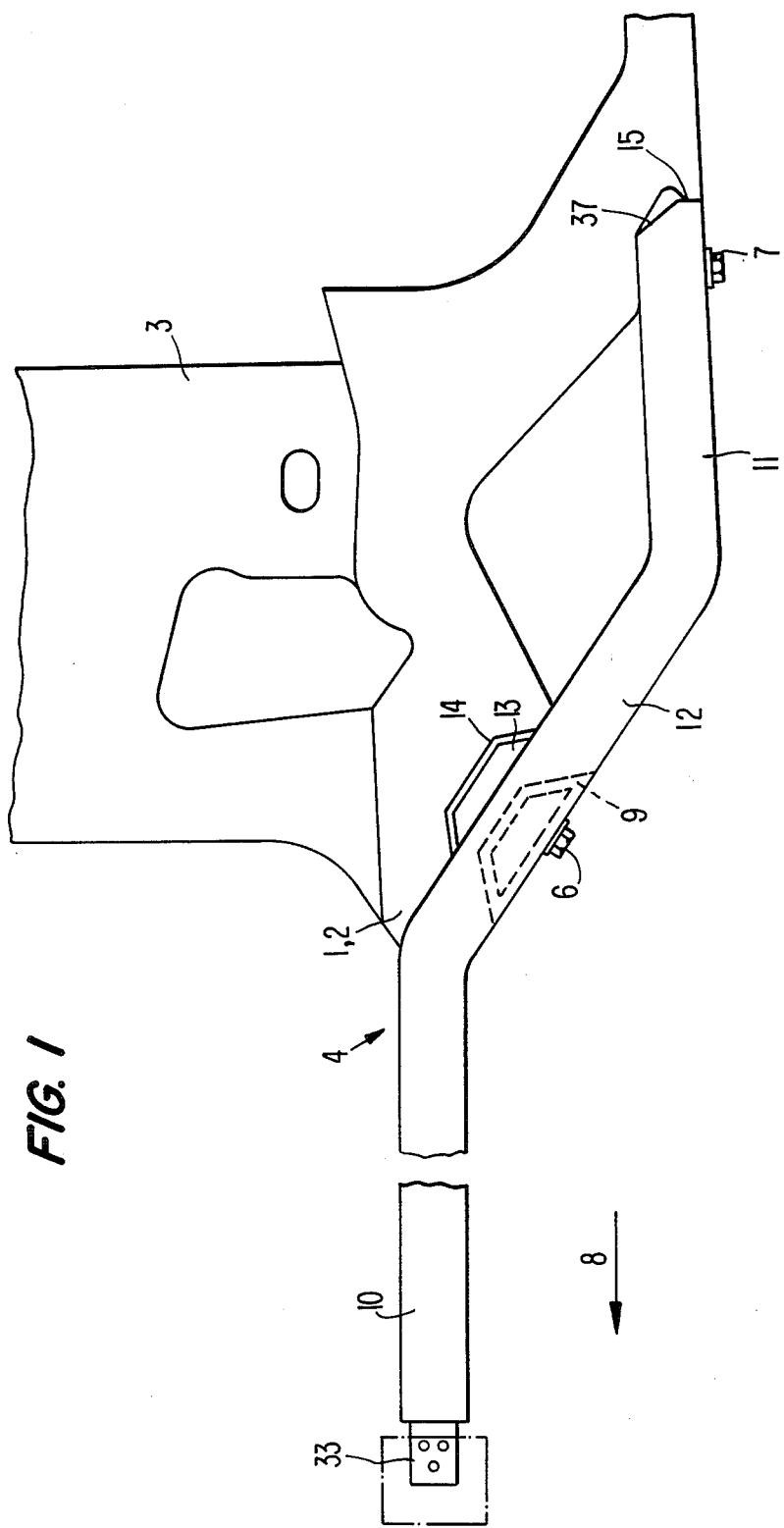
FIG. 1 is a side elevational view of an embodiment of the invention.

FIG. 1 illustrates a left longitudinal frame member 1 and a portion of a cross frame member 3 connecting the former with a corresponding right longitudinal frame member 2. The frame members 1 through 3 comprise portions of a main body supporting frame unit of a passenger car. To the longitudinal frame members 1 and 2, longitudinally disposed structural side members 4 and 5 are attached by means of two connecting bolts 6 and 7. Such connection points are disposed at an upper, forwardly disposed location and at a lower, rearwardly disposed location, viewed in the direction of travel of the vehicle. The two side members 4 and 5 are connected to each other by means of a transversely disposed, cross-piece member 9 in the area of the respective front connecting bolts 6. This connection may be either a threaded fastener connection or welded connection, where a threaded fastener connection, in particular, has the advantage that—especially in a partially laterally-acting collision—it is possible, for instance, to simply replace only one of the side members 4 or 5 without having to interfere with the axial geometry of the other side.

Side member 4 includes a forwardly disposed section 10, a vertically displaced, rearwardly disposed section 11 and an intermediate section 12 disposed at an angle to sections 10 and 11. Similarly side member 5 includes a forwardly disposed section 19, a vertically displaced, rearwardly disposed section 20 and an intermediate section 21 disposed at an angle to sections 19 and 20. The side members are laterally spaced and substantially transversely aligned. The axes of threaded fasteners 6 and 7 are disposed substantially perpendicular to intermediate sections 12 and 21 are rearwardly disposed sections 11 and 20, respectively, so that such axes are disposed at an angle relative to each other providing a rigid connection between the H-shaped extension unit defined by side members 4 and 5 and cross-piece member 9, and the main frame unit including frame members 1 through 3. Consequently, the extension unit along with other vehicle components mounted thereon can easily be attached as an integral unit onto the main frame unit during production assembly and removed as an integral unit from the main frame unit for repair or replacement purposes.

Figure 2:
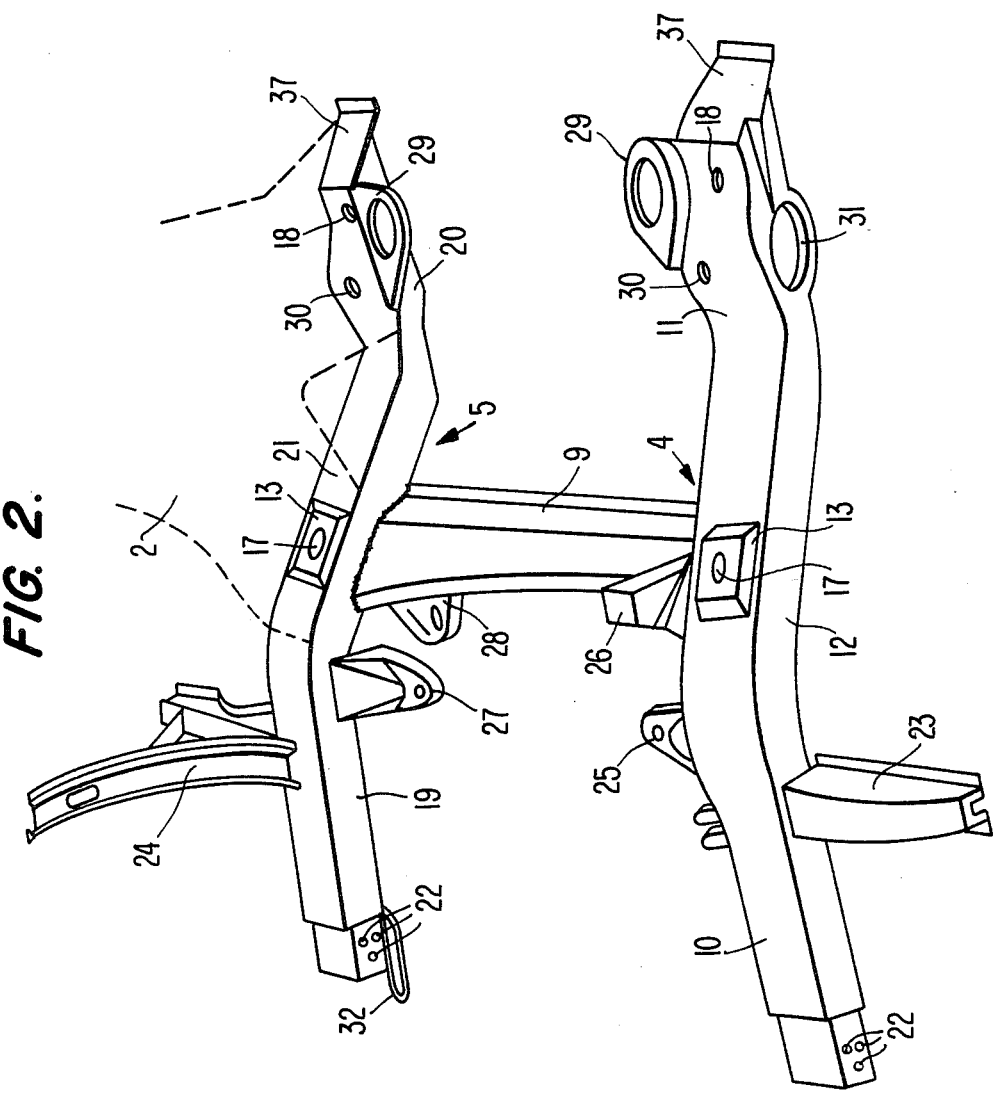
FIG. 2 is a perspective view of the embodiment shown in FIG. 1.

As best shown in FIGS. 1 and 2, the upper sides of intermediate sections 12 and 21 of the side members are provided with projections 13 disposed adjacent a fastener 6. Each projection has a truncated pyramidal configuration and is adapted to be received in a similarly configured recess 14 in a frame member 1 or 2 when the extension unit is mounted on the main frame unit. Each of the rearwardly disposed sections of the side members also are provided with an abutment surface 37 adjacent a fastener 7 which is adapted to engage a shoulder 15 on the main frame unit also when the extension unit is mounted on the main frame unit. The engagements of projection 13 and abutment surfaces 37 with the main frame unit function to transmit forces created by frontal or lateral impact loads applied to the vehicle from the extension unit to the main frame unit thus avoiding or minimizing shearing forces from being applied to fasteners 6 and 7.

FIG. 2 is a perspective representation of the frame arrangement according to this invention, shown as a separate assembly. It shows the H-configuration created by the two side members 4 and 5 as well as the cross-piece member 9. In addition, one of the main frame members 2 is indicated as well. Also, this representation shows especially clearly projections 13 in the shape of truncated pyramids with a hole 17 for connecting bolt 6. Similarly shown is a hole 18 for accommodating a connecting bolt 7.

The side members 4 and 5 as well as the cross-piece member 9 are formed as steel metal stampings although other material may be used. This could arise especially for reasons of strength, depending on the forces that may act upon the individual elements during a collision and on the desired degree of deformation, respectively. Among other things, one must also consider the static and dynamic loads resulting from the assemblies mounted to or supported by the front frame, in particular the engine and transmission.

In the embodiment as shown, the cross-piece member 9 is welded to side members 4 and 5. However, it is quite possible to provide a bolted, screw or riveted connection instead. The component section of side members 4 and 5 and cross-piece member 9 which make up the H-configuration, also are provided with holes 22, 30 and 31 for mounting or receiving various components, as well as webs 23 and 24 and retaining brackets 25 through 29 for installation of additional assemblies, especially the engine and transmission, within the engine compartment. A towing hook 32 is mounted to the front end section 19 of at least one of the side members 4 and 5. A front bumper 33 of the motor vehicle, for instance, may also be mounted to the two end faces of the front end sections 10 and 19 of the two side members 4 and 5. In this case, however, the bumper does not serve as an additional strengthening connection between the two side members 4 and 5, i.e., no significant transverse forces are transmitted through it.

Figure 3:
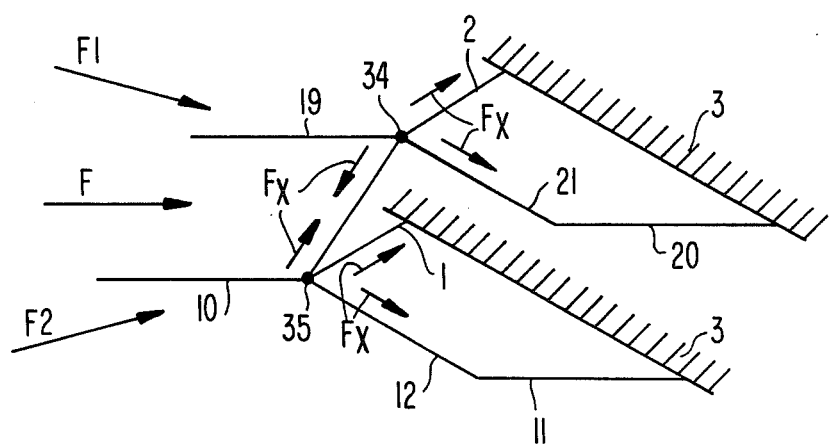
FIG. 3 is a diagram illustrating the resolution of forces resulting upon frontal and lateral impacts of loads applied to the front end of a vehicle provided with the present invention.

FIG. 3 is a diagram illustrating the resolution of forces created upon a frontal or lateral impact load being applied to the front end of a vehicle embodying the present invention. Depending on whether it is a frontal collision (F) or a more lateral impact (F1, F2), resultant forces (force arrows Fx) and moments of different magnitudes will be imposed upon the components. The two front end sections 10 and 19 of the side members essentially define the crumple zone and will therefore also sustain a corresponding deformation. Each front end section 10 and 19 terminates at a nodal point 34 and 35, which is disposed at the junctures of the side members 4 and 5, cross-piece member 9 and main frame sections 1 and 2, providing an extremely rigid system which safely absorbs the resultant forces and moments. The nodal points 34 and 35, similarly define the beginning of the safety zone for the vehicle's occupant.

The fame arrangement according to this invention thus makes it possible to achieve a defined distribution of the forces occurring during a collision and furthermore guarantees a precise demarcation between a crumple zone absorbing the kinetic energy of the impact, and a safety zone located in front of the passenger compartment, viewed in the direction of travel of the vehicle. Locating the front wheel suspension in the area of the cross-piece member 9 results in optimum stability of the frame arrangement in regard to the transverse forces resulting therefrom as well. In addition, it is possible to determine the dimensioning in accordance with the load—i.e., in accordance with the size of the engine to be used, and in accordance with the desired crash behavior—and to select appropriate materials for the components.

From the foregoing detailed description, it will be evident that there are a number of changes, adaptations and modifications of the present invention which come within the province of those persons having ordinary skill in the art to which the aforementioned invention pertains. However, it it intended that all such variations not departing from the spirit of the invention be considered as within the scope thereof as limited solely by the appended claims.

We claim:

1. A frame unit for a vehicle having a main frame unit comprising a pair of laterally spaced, longitudinally disposed structural side members and a transversely disposed structural cross-piece member defining an extension unit, said extension unit including means disposed at the intersections of said side members and said cross-piece member for rigidly securing said extension unit to said main frame unit sufficiently for transmitting impact loads from said extension unit to said main frame whereby sections of said side members extend forwardly of said main frame unit and are disposed in a crumple zone of said vehicle.

2. A frame unit according to claim 1 wherein said extension unit includes means engageable with said main frame unit for transmitting impact loads from said extension unit to said main frame unit.

3. A frame unit according to claim 2 wherein said load transmitting means are disposed adjacent to said securing means and cooperate therewith in transmitting said impact load to said main frame unit.

4. A frame unit according to claim 1 wherein said securing means include threaded fasteners.

5. A frame unit according to claim 1 including second means disposed on said side members rearwardly of said cross-piece member for securing said extension unit to said main frame unit.

6. A frame unit according to claim 5 wherein said extension unit includes means engageable with said main frame unit for transmitting impact loads from said extension unit to said main frame unit.

7. A frame unit according to claim 6 wherein said load transmitting means are disposed adjacent to said securing means and cooperate therewith in transmitting said impact loads.

8. A frame unit according to claim 5 wherein said securing means include threaded fasteners.

9. A frame unit according to claim 1 including means disposed on said side members for mounting other components of said vehicle on said extension unit.

10. A frame unit according to claim 1 wherein each of said side members include a forwardly disposed section, an intermediate section and a rearwardly disposed section and said cross-piece section interconnects said intermediate section of said side members.

11. A frame unit according to claim 10 wherein each of said intermediate section is disposed at an angle relative to integral forwardly and rearwardly disposed sections.

12. A frame unit according to claim 10 including means engageable with said main frame unit and disposable adjacent to and cooperable with said securing means for transmitting impact loads from said extension unit to said main frame unit.

13. A frame unit according to claim 10 wherein said rearwardly disposed sections of said side members include second means for securing said extension unit to said main frame unit.

14. A frame unit according to claim 13 including means engageable with said main frame unit and disposed adjacent to and cooperable with said second securing means for transmitting impact loads from said extension unit to said main frame unit.

15. A frame unit according to claim 14 wherein said securing means include threaded fasteners

* * * * *